Patented May 22, 1923.

1,455,982

UNITED STATES PATENT OFFICE.

FRANK J. ADAMS, OF NEW YORK, N. Y., ASSIGNOR, BY MESNE ASSIGNMENTS, OF ONE-HALF TO EDGAR J. MARSTON, OF GREENWICH, CONNECTICUT, AND ONE-HALF TO H. ARMOUR SMITH, OF YONKERS, NEW YORK.

PROJECTION PICTURE SCREEN AND PROCESS OF MAKING SAME.

No Drawing. Application filed April 14, 1920, Serial No. 373,962. Renewed August 2, 1921. Serial No. 489,198.

*To all whom it may concern:*

Be it known that I, FRANK J. ADAMS, a citizen of the United States, residing at New York city, borough of Manhattan, county and State of New York, have invented new and useful Improvements in Projection Picture Screens and Processes of Making Same, of which the following is a specification.

My invention relates to certain new and useful improvements in screens for use in the exhibition of motion and still pictures by projection, and also to the method of making the same.

In the use of such screens two methods of projection are employed; namely, "front projection," where the projecting machine is located upon the same side of the screen as the spectators, and "rear projection" where the machine is located behind or upon the opposite side of the screen from the audience. In front projection, opaque screens are generally employed so that none of the light rays may pass through the screen and be lost; whereas, in rear projection, more or less translucent screens are obviously necessary.

In the case of either front or rear projection, it is desirable that the screen surface shall possess to a high degree the property of diffuse reflection; that is, the property of scattering the incident light waves falling upon it, so that each point of the surface becomes a new source of waves. At the same time, and especially in the case of opaque screens, it is desirable that there be as little regular reflection of the incident light waves as possible, for such reflection produces a glare or shine upon the screen, which is very unpleasant to the spectators, and impairs their view of the projected picture.

Opaque screens, which possess the requisite reflecting power, necessarily have the property of regular reflection to some degree, at least; and in order to avoid, as much as possible, glares or shines upon the screen, it is necessary that the auditorium be kept dark, or that no lights be located in the auditorium where they may be reflected from the screen to the spectators.

Where rear projection is employed, it is of great importance that the screen possesses the property of complete diffusion, for, if any light rays are allowed to pass directly through the screen, the light source becomes visible to the spectators and seriously impairs the appearance of the picture.

In picture exhibition, front projection has been heretofore more generally employed, partly because of the fact that no completely satisfactory translucent screen has been commercially produced. Ground glass has been used with some success, as it possesses to a high degree the desired light diffusing properties; but its excessive cost, great weight and extreme fragility renders its use, in most cases, impracticable.

The principal object of my invention, therefore, has been to provide a screen for exhibiting pictures by either front or rear projection which will possess to a very high degree the property of diffuse reflection, with as little attendant direct reflection as possible, and one which will be economical to manufacture, light in weight, and not easily injured.

It will be found that the screen of my invention may be used satisfactorily with front projection, as it will possess but little direct reflective properties, and it may be used in an auditorium containing considerable light, or even in daylight, without seriously impairing the picture. On the other hand, when used with rear projection, extremely accurate and clear definition may be obtained, coupled with a high degree of illumination; and, at the same time, the screen accomplishes a complete diffusion of all the light rays, so that none of them are directly transmitted to the audience.

Broadly stated, my invention comprehends the use of a flexible base impregnated, coated or treated with a medium adapted to render it translucent and capable of complete diffusion of all light rays which may be projected thereon.

The preferred form of my invention comprises a suitable fabric so impregnated, coated or treated; and one form of screen which I have found satisfactory is produced as follows:

A suitable fabric is taken from a bolt and cut and sewn to the requisite dimensions, after which it may be stretched upon and securely fastened to a suitable framework. A material which I have found admirably suitable is a fine grade of sateen-finished cotton cloth, in white, light tan or light blue. I have found white to be preferable in the manufacture of screens for a majority of purposes, but other colors and other grades, qualities or materials from that above specified may be used without departing from the spirit of my invention.

A fireproof screen is frequently desirable, and, where such is the case, it may be conveniently produced as follows:

The screen fabric, having been mounted and stretched upon its frame, so as to remove all wrinkles and creases, is then immersed in a tank containing a suitable fireproofing solution. An example of such solution is as follows:

2 parts ammonium chloride;
2 parts ammonium phosphate;
3 parts ammonium sulphate;
40 parts water.

These ingredients are thoroughly mixed, and the screen is immersed and permitted to remain in the solution for a period of about ten minutes, after which it is removed, placed in a substantially upright position and allowed to become thoroughly dry.

After drying, the screen fabric is then preferably treated with a weak solution of starch. This is made by dissolving about one pound of starch in three gallons of water. The starch must be thoroughly dissolved, by agitation or other suitable means, and the solution heated to the boiling point, preferably in a tank of sufficient dimensions to receive the screen fabric and its supporting frame.

After the starch solution has reached the boiling point, the screen is immersed or dipped therein and allowed to remain a sufficient length of time to permit it to become thoroughly saturated and all of the pores to be filled up, after which the screen is removed from the tank and permitted to drain and dry.

In some instances, it may be found desirable to subject the starched screen to an ironing operation, after it has become dry. This aids somewhat in the uniform distribution of the starch upon the surface, and within the pores of the screen. Where the ironing operation is used, care must be exercised not to have the iron sufficiently hot to burn or discolor the screen.

The next operation to which the screen is treated is that of paraffining, and for this purpose I prefer to use refined paraffine wax, which becomes fluid at a temperature of from 128 to 130° F. The wax is placed in a suitable tank or container, and heated by any suitable means to bring it somewhat above the melting point. When it is all fluid, the screen is immersed therein and allowed to remain two minutes or more, or long enough to enable the fabric to become thoroughly impregnated or coated therewith.

The screen is then removed and allowed to drain and dry, and, if the operation has been successfully carried out, the screen will have an uniformly thin coating of paraffine wax throughout its entire surface.

In some cases, it may be found desirable to somewhat thin down the wax, and this may be done by adding a small quantity of a suitable solvent for that purpose. In most cases, however, a successful screen may be made with the refined wax alone and without any added solvent.

In carrying on the foregoing operations, and especially the paraffining process, I prefer to work in a room maintained at a relatively high temperature, by steam, or other suitable means. This, however, is not essential; but will be found to facilitate the drying and setting of the various solutions. Where such a heated room is employed, the production of screens will be not only expedited; but their character and quality will be improved and made more uniform. A screen made according to my invention will be found to be flexible and translucent and to have light diffusing properties of the order of ground glass.

I prefer to subject the screen fabrics to the various operations, after they have been mounted upon a frame, for they thus are stretched and not liable to be frayed, cracked or have their surfaces impaired by subsequent handling.

I also prefer to use for the various solutions tanks of sufficient size to receive the mounted screens, but it will be understood that in some cases this may not be essential, and the fabric may be treated before mounting.

I also prefer to immerse fabrics in the various solutions, but this again is not essential, as other methods of application may be employed.

Any and all means of application are within the scope of my invention, and it is obvious that one or more of the various operations or treatments which I have heretofore described may be omitted without departing from the spirit of my invention. For instance, the starching operation may be omitted, and a very satisfactory screen produced by the paraffining operation alone.

Where the starching and paraffining operations are both employed, the former will to a considerable extent fill up the pores of the fabric and the subsequent application of the paraffine serves more as a surfacing preparation; nevertheless, even in this case paraffin will penetrate the fabric to some extent at least and will close up any pores and interstices which have not been closed by the starch. Where the paraffine is employed alone, and without starch, the fabric becomes not only coated but thoroughly saturated with the solution and if uniformly applied provides a screen of high uniform translucency.

The formulas herein specified are for illustrative purposes only, and are not to be understood as constituting limitations or essential characteristics of my invention in its broadest aspect. Furthermore, the particular sequence of operations above described form no necessary part of my invention, but simply constitute the best method of manufacturing my screen now known to me; and I would have it particularly understood that any changes, whether in materials, chemicals, formulas, sequences or operations which do not lie beyond the scope of my invention as defined in the claims, are, and are intended to be a part of this my invention.

It will be understood that the use of the word paraffine or paraffine wax in this specification is not intended to indicate that particular substance only but is to be understood as referring to any similar substance or one possessing the desirable characteristics thereof.

Having thus described a typical form of my invention, what I claim and desire to secure by Letters Patent is:

1. A screen for the exhibition of projected pictures, having a reflecting surface of paraffine of such a character as to diffuse substantially all incident light rays.

2. A flexible screen for the exhibition of projected pictures, said screen having a reflecting surface of paraffine of such a character as to diffuse substantially all incident light rays.

3. A translucent screen for the exhibition of projected pictures having a surface of paraffin and possessing light-diffusing properties substantially of the order of that of ground glass.

4. A screen for the exhibition of projected pictures fireproofed with ammonium salts and having a surface of paraffine.

5. A flexible starch-loaded screen for the exhibition of projected pictures having a surface of paraffine.

6. A screen for the exhibition of projected pictures, comprising fabric, the interstices of which are filled with starch, said screen having a surface of paraffine.

7. A screen for the exhibition of projected pictures consisting of a fabric fireproofed with ammonium salts and coated with paraffine.

8. A translucent screen consisting of fabric impregnated with paraffine wax and possessing a surface adapted to diffuse substantially all incident light rays impinging thereon.

9. A translucent screen consisting of fabric fireproofed with ammonium salts and coated with paraffine.

10. A translucent screen consisting of fabric fireproofed with ammonium salts, the interstices of which are filled with starch and the surface of which is coated with paraffine.

11. The process of producing a picture projection screen, consisting in mounting in flat relation a flexible base upon a suitable framework, subjecting the same to a weak solution of starch, and drying the same, and then coating or impregnating it with paraffine wax.

12. The process of producing a picture projection screen, consisting in first subjecting a flexible base to a fireproofing process, and thereafter coating or impregnating the same with paraffine wax.

13. The process of making a picture projection screen, consisting in subjecting a flexible fabric to a fireproofing process, thereafter treating the same with a solution of starch, drying the same, and thereafter coating or impregnating it with paraffin wax.

14. The process of treating fabric to render the same translucent and fireproof for the production of screens to be used in the projection of pictures and the like, consisting in dipping the fabric in a solution composed of water, ammonium chloride, ammonium phosphate and ammonium sulphate, permitting the fabric to dry, then immersing the fabric in a weak solution of boiling starch and permitting the fabric to dry, and then immersing the fabric in a boiling solution of paraffin wax and permitting it to drain and dry.

FRANK J. ADAMS.